June 16, 1931.  K. RICE  1,810,529
ELECTRIC APPARATUS FOR TEACHING MATHEMATICS
Filed Jan. 24, 1930
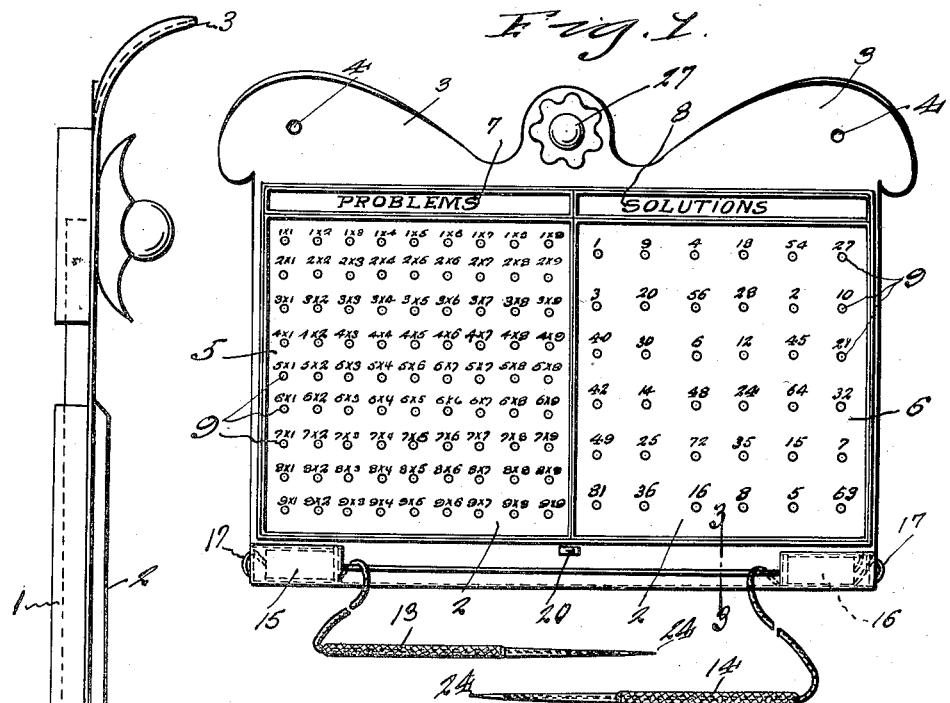
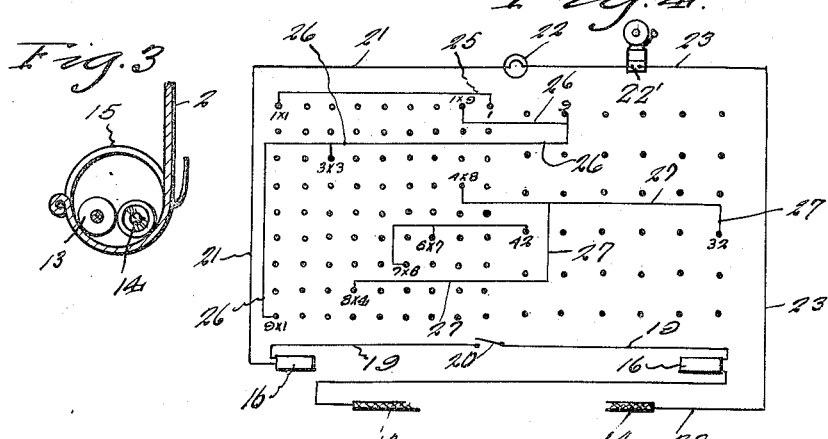
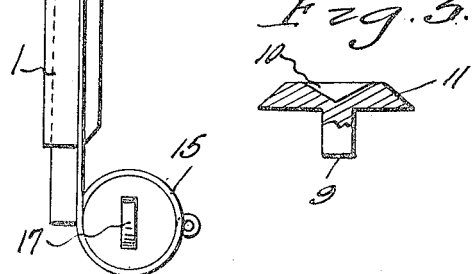
Inventor
Kirk Rice
By Clarence A. O'Brien
Attorney Patented June 16, 1931

1,810,529

UNITED STATES PATENT OFFICE

KIRK RICE, OF OKLAHOMA CITY, OKLAHOMA, ASSIGNOR TO H. F. ALLEN, OF OKLAHOMA CITY, OKLAHOMA

ELECTRIC APPARATUS FOR TEACHING MATHEMATICS

Application filed January 24, 1930. Serial No. 422,996.

My invention relates to apparatus for teaching mathematics.

The objects of my invention are to provide a device of this class which is new, novel, practical and of utility; which will be particularly useful in the teaching of mathematics to children in the lower grades of school; which will create interest of the pupils in mathematics; which may be operated by the teacher and a pupil, or may be operated by the pupil singly; which will be neat in appearance; which will be simple in construction; which will be economic in operation and manufacture; which will be durable; and which will be efficient in accomplishing all the purposes for which it is intended.

At the present time considerable trouble is encountered by teachers in interesting pupils in the study of mathematics. My invention will tend to create this interest.

The embodiment of the invention herein described and illustrated in the accompanying drawings discloses the device arranged for teaching the multiplication tables up to and including nine times nine. It is to be understood, however, that the device could be constructed to cover other mathematical problems including division, addition, algebra and the like without departing from the spirit or broad principles of my invention.

With these and other objects in view as will more fully appear, my invention consists in the construction, novel features, and combination of parts hereinafter more fully described, pointed out in the claims hereto appended, and illustrated in the accompanying one-sheet drawings, of which, Figure 1 is a front elevational view;

Fig. 2 is a vertical sectional view;

Fig. 3 is a sectional view along the lines 3—3 of Fig. 1;

Fig. 4 is a schematic view illustrating the wiring arrangement; and

Fig. 5 is an enlarged sectional view of one of the contact points.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

One practical embodiment of the invention as illustrated in the drawings comprises:

A flat, rectangular back board 1 of some suitable non-conductive material such as wood or the like. Flatly covering the front surface of said board 1 is provided a sheet metal face member 2. The top portion of member 2 is formed in some desired design such as the scroll 3 bent forward from the plane of said member 2, and is provided with some means for hanging the device flatly against the wall such as the perforations 4. The front face of member 2 is divided by painting or the like into two general sections 5 and 6. Section 5 is headed by a suitable designation such as the word "Problems", as shown at 7, while said section 6 is headed by a suitable designation such as the word, "Solutions", as shown at 8. As best seen in Fig. 1, it may be seen that said section 5 bears nine horizontal lines of contact points 9, and that numerals and insignia representing one problem in the multiplication tables are printed adjacent each one of said contact points 9. Said contact points 9 are of metal and each has a conical cavity 10 in its beveled edged head 11. The shaft of each of said contact points 9 extends through said members 2 and 1 in an insulated manner, and threadedly receives a nut, not shown, upon its rear end. Said contact points and said nuts act as a means for rigidly holding said members 1 and 2 together and as a means for connecting conducting wires described later. Said section 6 is provided with 6 horizontal rows of said contact points 9, each one of which are designated by numerals. Each one of said designating numerals represent an answer to one or more of the problems in said section 5.

The extreme lower portion of the metal of which said member 2 is formed, is turned upwardly and outwardly forming a trough 12 for receiving pointers 13 and 14 when they are not in use. Each end of said trough 12 has a convolute portion 15 forming a hollow cylinder for receiving a battery 16. The outer end of each of said portions 15 is closed by a handled plug 17.

Referring now more particularly to Fig. 4 of the drawings, the wiring arrangement will be explained.

Pointer 13 is connected by a wire 18 leading to one pole of one of said batteries 16. The other pole is connected by a wire 19 having a manually operated switch 20 to one pole of the other battery 16. Said other battery 16 is connected by wire 21 through a lighting element 22 and an audible signal 22' which is connected by a wire 23 to said pointer 14. It may here be explained that said pointers 13 and 14 have a metal core terminating in points 24, and are exteriorly insulated from their respective cores except at said points 24.

It will now be seen that a circuit is thus provided from point 24 of pointer 13 to point 24 of pointer 14, when said switch 20 is closed, but that the circuit is open between said points 24 until they are touched together or are otherwise connected.

The contact points 9 in section 5 of the board which represent certain problems are wired in series with the contact points 9 of section 6 which represent the respective answers to said problems. Thus it will be seen that the contact point 9 of the problem 1 x 1 is connected by a wire 25 to the contact point 9 in section 6 which is designated by the answer numeral 1. Likewise it may be seen that the contact points 9 of the problems 1 x 9, 9 x 1, and 3 x 3 are connected by wires 26 to the contact point 9 which is designated by the answer numeral 9 in section 6. In a similar manner the contact points of problems 4 x 8 and 8 x 4 are connected by wire 27 to answer contact designated as point 32. All of the wiring arrangement is carried on the rear face of said board 1, and all problems are wired to their corresponding answers.

In operation the teacher will place the point 24 of said pointer 13 upon the contact point 9 of a desired problem. The pupil will touch the point 24 of pointer 14 to one of the answer contacts. If the correct answer contact is touched by the pupil's pointer, light 22 will be illuminated. Any other answer contact touched by the pupil will not illuminate the said light 22. The conical cavities 10 in contacts 9 act as seats for the pointer tips 24. Should it be found desirable, an audible signal such as a bell 22' or the like may be substituted for said light 22, or both may be provided if desired.

When said pointers 13 and 14 are not in use, and are at rest in said trough 12, switch 20 will be manually operated and the circuit opened to prevent the contacting of points 24 from discharging the batteries 16.

Obviously, the invention is susceptible of embodiment in forms other than that which is illustrated in the accompanying drawings and described herein, and applicable, for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. A question and answer device characterized by a board having question and corresponding answer contacts electrically connected in circuit with a pair of pointers, a source of electric energy and signal means; said contacts comprising a shallow cup adapted to receive the tips of said pointers.

2. A device of the character described having in combination, a board having the front face thereof divided into a question area and an answer area, said question area disposed laterally of the answer area to present an unobstructed view to the class-room while in operation, plural aligned rows of contact points in each section anchored to the board and each having a head formed with shallow cups, said board bearing indicia associated with the contact points on the question area and also having indicia associated with the contact points on the answer area, an audible and visible signal carried by the board, a pair of pointers coupled to said board and movable in all directions with respect thereto, a source of electrical energy carried by the board and electrically connected to the pointers and signals, and said contact points on the question area connected in series with the corresponding contact points on the answer area.

KIRK RICE.